US008706119B2

(12) United States Patent
Jeon et al.

(10) Patent No.: US 8,706,119 B2
(45) Date of Patent: Apr. 22, 2014

(54) GROUP HANDOVER METHOD AND APPARATUS IN BROADBAND WIRELESS COMMUNICATION SYSTEM THAT SUPPORTS MOBILE RELAY STATION

(75) Inventors: Young-Hyun Jeon, Guri-si (KR); Jong-Hyung Kwun, Seoul (KR); Chan-Ho Min, Seoul (KR); Jae-Hyun Kim, Seoul (KR); Sin-Hun Kang, Daegu (KR); Hyun-Jin Lee, Pohang-si (KR)

(73) Assignees: Samsung Electronics Co., Ltd., Suwon-si (KR); Ajou University Industry-Academic Cooperation Foundation, Suwon-si (KR)

( * ) Notice: Subject to any disclaimer, the term of this patent is extended or adjusted under 35 U.S.C. 154(b) by 85 days.

(21) Appl. No.: 13/254,982

(22) PCT Filed: Mar. 5, 2010

(86) PCT No.: PCT/KR2010/001404
§ 371 (c)(1),
(2), (4) Date: Sep. 6, 2011

(87) PCT Pub. No.: WO2010/101442
PCT Pub. Date: Sep. 10, 2010

(65) Prior Publication Data
US 2012/0003962 A1 Jan. 5, 2012

(30) Foreign Application Priority Data
Mar. 6, 2009 (KR) .................. 10-2009-0019445

(51) Int. Cl.
*H04W 36/00* (2009.01)
(52) U.S. Cl.
USPC ............ 455/436; 455/437; 455/438; 455/439

(58) Field of Classification Search
None
See application file for complete search history.

(56) References Cited

U.S. PATENT DOCUMENTS

| 2007/0064647 | A1* | 3/2007 | Prasad ........................... 370/331 |
| 2007/0249347 | A1* | 10/2007 | Saifullah et al. .............. 455/436 |
| 2010/0150157 | A1* | 6/2010 | Wang et al. ................... 370/392 |

FOREIGN PATENT DOCUMENTS

KR 10-2007-0042243 A 4/2007
(Continued)

OTHER PUBLICATIONS

Wang Haiguang, Data forwarding and routing path setup for IEEE 802.16j multihop wireless networks, Nov. 14, 2006, IEEE 802.16 Session#46 Dallas, Texas, USA (http://www.ieee802.org/16/relay/contrib/S80216j-06_212.pdf).*

*Primary Examiner* — Suhail Khan
(74) *Attorney, Agent, or Firm* — Jefferson IP Law, LLP

(57) ABSTRACT

Group handover method and apparatus in a broadband wireless communication system which supports a mobile relay station are provided. A method of a serving base station for group handover of the mobile relay station includes when receiving a measurement report message from a relay station, determining whether the relay station is a mobile relay station of a simple type which forwards a signal; collecting handover related information of the mobile relay station and mobile terminals belonging to the mobile relay station, from pre-stored information; requesting handover of the mobile relay station and the mobile terminals by transmitting the collected handover related information to a target base station; and receiving a message indicating whether the handover of the mobile relay station and the mobile terminals is approved, from the target base station.

8 Claims, 13 Drawing Sheets

(56) References Cited

FOREIGN PATENT DOCUMENTS

| KR | 10-2007-0072785 A | 7/2007 |
| KR | 10-2008-0043682 A | 5/2008 |
| KR | 10-2008-0047735 A | 5/2008 |
| KR | 10-2008-0109857 A | 12/2008 |

* cited by examiner

GROUP HANDOVER METHOD AND APPARATUS IN BROADBAND WIRELESS COMMUNICATION SYSTEM THAT SUPPORTS MOBILE RELAY STATION

PRIORITY

This application is a National Stage application under 35 U.S.C. §371 of an International application filed on Mar. 5, 2010 and assigned application No. PCT/KR2010/001404, and claims the benefit under 35 U.S.C. §365(b) of a Korean patent application filed Mar. 6, 2009 in the Korean Intellectual Property Office and assigned application No. 10-2009-0019445, the entire disclosure of which is hereby incorporated by reference.

BACKGROUND OF THE INVENTION

1. Field of the Invention

The present invention relates generally to group handover method and apparatus in a broadband wireless communication system which supports a mobile relay station. More particularly, the present invention relates to methods and apparatuses of a mobile relay station for performing handover in place of a plurality of dependent terminals and of a serving base station for performing authentication for the plurality of the terminals over a backhaul in the handover in a broadband wireless communication system.

2. Description of the Related Art

In a cellular system, to provide seamless communication of high reliability to mobile stations in a vehicle, a handover scheme of a mobile relay station is described. For example, in this scheme, a mobile relay station mounted to a fast transport means such as bus or train performs the handover in place of a plurality of terminals existing in the fast transport means and thus provides the seamless and highly reliable service to the plurality of the terminals. That is, in the cellular system, to shorten a time of the interrupted service in the handover, the mobile relay station performs the handover in place of the plurality of the terminals and merely informs the terminals of the result.

FIG. 1 illustrates a handover procedure in an 802.16j-based broadband wireless communication system which supports the mobile relay station according to a conventional method.

Referring to FIG. 1, when a handover event occurs, a Relay Station (RS) 104 covering a Mobile Station (MS)1 100 and an MS2 102 requests Media Access Control (MAC) addresses or handover identifiers of the MSs 100 and 102 by transmitting a handover request (MOB_MSHO-REQ) message to a serving Base Station (BS) 106 in step 110. The serving BS 106 transmits a handover response (MOB_BSHO-RSP) message including the MAC addresses or the handover identifiers of the MSs 100 and 102 to the mobile RS 104 in step 112.

Next, the mobile RS 104 transmits a handover indication (MOB_HO-IND) message to the serving BS 106 to disconnect from the serving BS 106 in step 114, and transmits a ranging request (RNG_REQ) message including the MAC addresses or the handover identifiers of the MSs 100 and 102 to reconfigure the connect to a target BS 108 in step 116. The target BS 108 receiving the ranging request (RNG-REQ) message generates and transmits an independent ranging response (RNG-RSP) message to the mobile RS 104 according to the MAC addresses or the handover identifiers of the MSs 100 and 102 in step 118.

Next, the mobile RS 104 transmits the ranging response message received from the target BS 108 to the MSs 100 and 102 to finish the handover procedure in steps 120 and 122.

In the above scheme, the mobile RS checks integrity of the ranging response (RNG-RSP) message received from the target BS in a MAC-Security Sublayer (SS) 201 as shown in FIG. 2, decapsulates the ranging response (RNG-RSP) message of the MSs which are encapsulated in the RNG-RSP message, and then transmits the message to the MSs. Accordingly, when the mobile RS does not have the MAC-SS, it cannot obtain the ranging response message to transmit to the MSs. When the MAC-SS is added to the mobile RS, the complexity increases.

In the meantime, when the target BS and the serving BS use different authentication keys or when the target BS and the serving BS use the same authentication key but the authentication key needs to update because the authentication key is expired before the handover procedure is completed, the MSs should hand over and be re-authenticated in the target BS, which disadvantageously increases a service interruption time. In addition, since the re-authentication should be carried out when the target BS cannot support a security algorithm used by the MS, the service interruption time increases.

SUMMARY OF THE INVENTION

To address the above-discussed deficiencies of the prior art, it is a primary aspect of the present invention to provide group handover method and apparatus in a broadband wireless communication system which supports a mobile relay station.

Another aspect of the present invention is to provide a method and an apparatus of a mobile relay station for performing handover in place of a plurality of dependent terminals in a broadband wireless communication system.

Yet another aspect of the present invention is to provide a method and an apparatus of a serving base station for authenticating terminals over a backhaul when a mobile relay station performs handover in place of a plurality of dependent terminals in a broadband wireless communication system.

Still another aspect of the present invention is to provide a method and an apparatus of a serving base station for performing authentication with a target base station by obtaining authentication information of a plurality of terminals in process of a handover preparation procedure when a mobile relay station performs handover in place of a plurality of dependent terminals in a broadband wireless communication system.

According to one aspect of the present invention, a method of a serving base station for group handover of a mobile relay station in a broadband wireless communication system, includes when receiving a measurement report message from a relay station, determining whether the relay station is a mobile relay station of a simple type which forwards a signal; collecting handover related information of the mobile relay station and mobile terminals belonging to the mobile relay station, from pre-stored information; requesting handover of the mobile relay station and the mobile terminals by transmitting the collected handover related information to a target base station; and receiving a message indicating whether the handover of the mobile relay station and the mobile terminals is approved, from the target base station.

According to another aspect of the present invention, a group handover method of a mobile relay station in a broadband wireless communication system includes transmitting a measurement report message including at least one of a cell identifier and type information of the mobile relay station, to a serving base station; receiving a message indicating handover to a target base station, from the serving base station; releasing connection to the serving base station; performing synchronization for the target base station and radio resource acquisition; and transmitting a handover complete message including uplink resource information required by mobile terminals belonging to the mobile relay station, to the target base station.

According to yet another aspect of the present invention, a method of a target base station for group handover of a mobile relay station in a broadband wireless communication system includes receiving a handover request message including handover related information of a mobile relay station and mobile terminals belonging to the mobile relay station; determining whether to approve handover of the mobile relay station and the mobile terminals; and when determining to approve the handover, transmitting a handover ACK message including security algorithm information of the target base station, to the target base station.

According to still another aspect of the present invention, a handover method of a mobile terminal which communicates via a mobile relay station in a broadband wireless communication system includes receiving security algorithm information of a target base station, from a serving base station; updating a security key according to the received security algorithm information; being allocated an uplink resource from the target base station; and transmitting a message indicating the security key update to the target base station through the allocated uplink resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
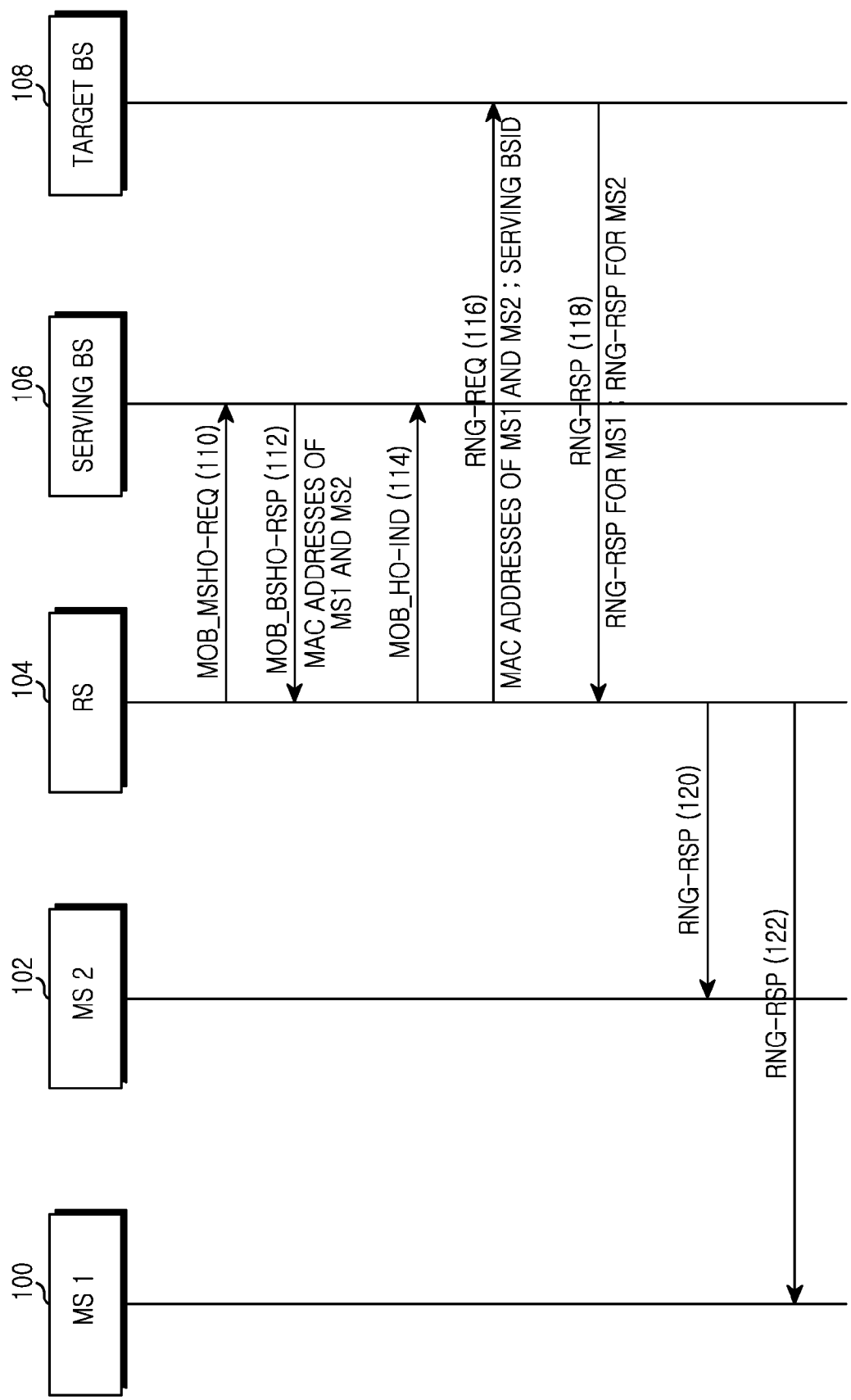
FIG. 1 illustrates a handover procedure in an 802.16j-based broadband wireless communication system which supports a mobile relay station according to a conventional method.
Figure 2:
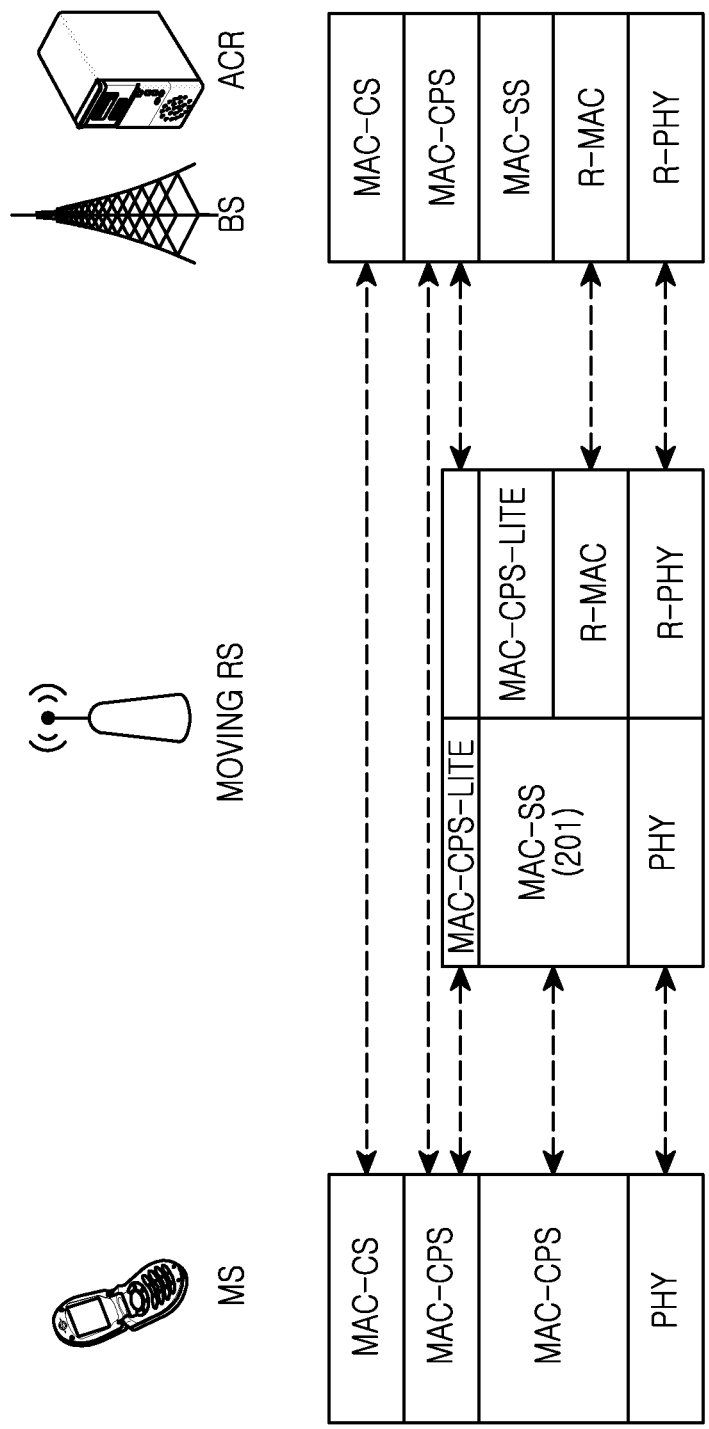
FIG. 2 illustrates nodes in the 802.16j-based broadband wireless communication system which supports the mobile relay station according to the conventional method.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide methods and apparatus of a mobile relay station for performing handover in place of dependent terminals and of a serving base station for obtaining authentication information of the terminals and performing authentication with a target base station over a backhaul in a broadband wireless communication system which supports the mobile relay station.

Hereinafter, to facilitate the understanding, while an Institute of Electrical and Electronics Engineers (IEEE) 802.16j system and a 3$^{rd}$ Generation Partnership Project Long Term Evolution (3GPP LTE) system are explained by way of example, the present invention is applicable to every system in which a mobile relay station performs handover in place of a plurality of dependent terminals. In the IEEE 802.16j system, a base station is expressed as a Base Station (BS), a mobile relay station is expressed as a Mobile Relay Station (MRS), and a terminal is expressed as a Mobile Station (MS). In the 3GPP LTE system, the base station is expressed as an eNode B, the mobile relay station is expressed as a mobile eNode R or a mobile relay, and the terminal is expressed as a User Equipment (UE).

Figure 3:
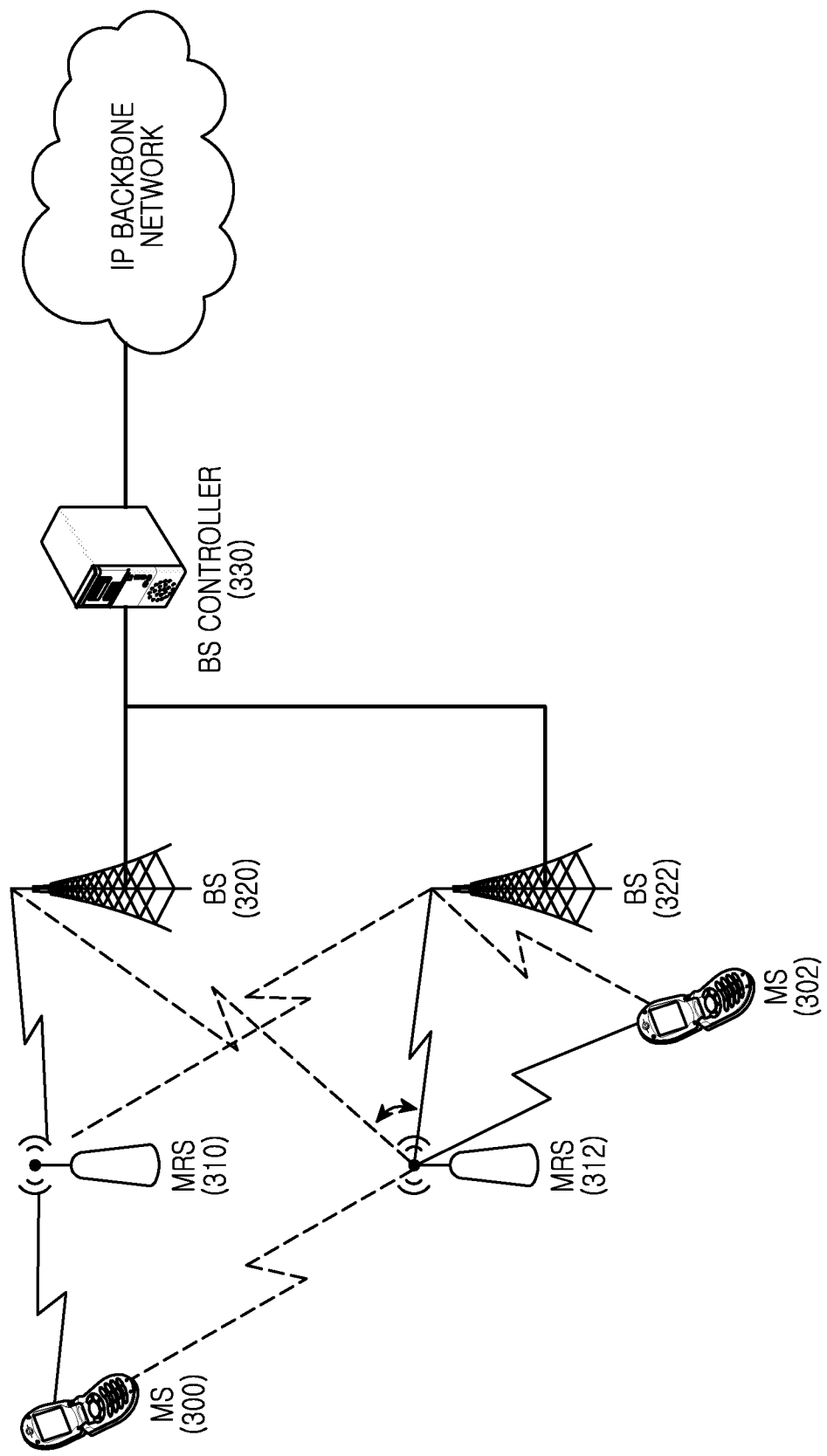
FIG. 3 illustrates a construction of a broadband wireless communication system which supports a mobile relay station according to an exemplary embodiment of the present invention.

FIG. 3 illustrates a construction of a broadband wireless communication system which supports a mobile relay station according to an exemplary embodiment of the present invention.

Referring to FIG. 3, BSs 320 and 322 provide connection of a radio section to MSs 300 and 302 by interfacing with wireless access, and a BS controller 330 manages connection and mobility of the MSs 300 and 302. Herein, the MSs 300 and 302 may be connected to the BSs 320 and 322 through direct links, and may be connected to the BSs 320 and 322 via MRSs 310 and 312 as their channel state to the BSs 320 and 322 deteriorates according to fast movement.

Meanwhile, when the MRS 310 moves from the serving BS 320 into an area of the neighboring BS 320, the MRS 310 performs handover to the neighboring BS 322 on behalf of the MSs 300.

Herein, according to exemplary embodiments of the present invention, the MRS 310 performs the handover in place of a plurality of its dependent MSs 300, and the serving BS 320 performs an authentication procedure with a neighboring BS which is the handover target; that is, with the target BS 322 over the backhaul using authentication information of the MSs 300 covered by the MRS 310 when a handover preparation procedure is conducted. That is, when the handover of the MRS 310 is required, the serving BS 320 obtains authentication related information of the MSs 300 covered by the MRS 310, transmits a handover request message including the authentication related information of the MSs 300 to the target BS 322 over the backhaul, obtains authentication related information of an authentication key to be used by the MSs 300 and the target BS 322 through a handover response (HO-RSP) message, and then transmits the obtained authentication related information to the MSs 300 before the handover preparation procedure is completed.

Now, the handover of the MRS in place of the plurality of the MSs in the IEEE 802.16j system is described by referring to FIGS. 4 through 8.

Figure 4:
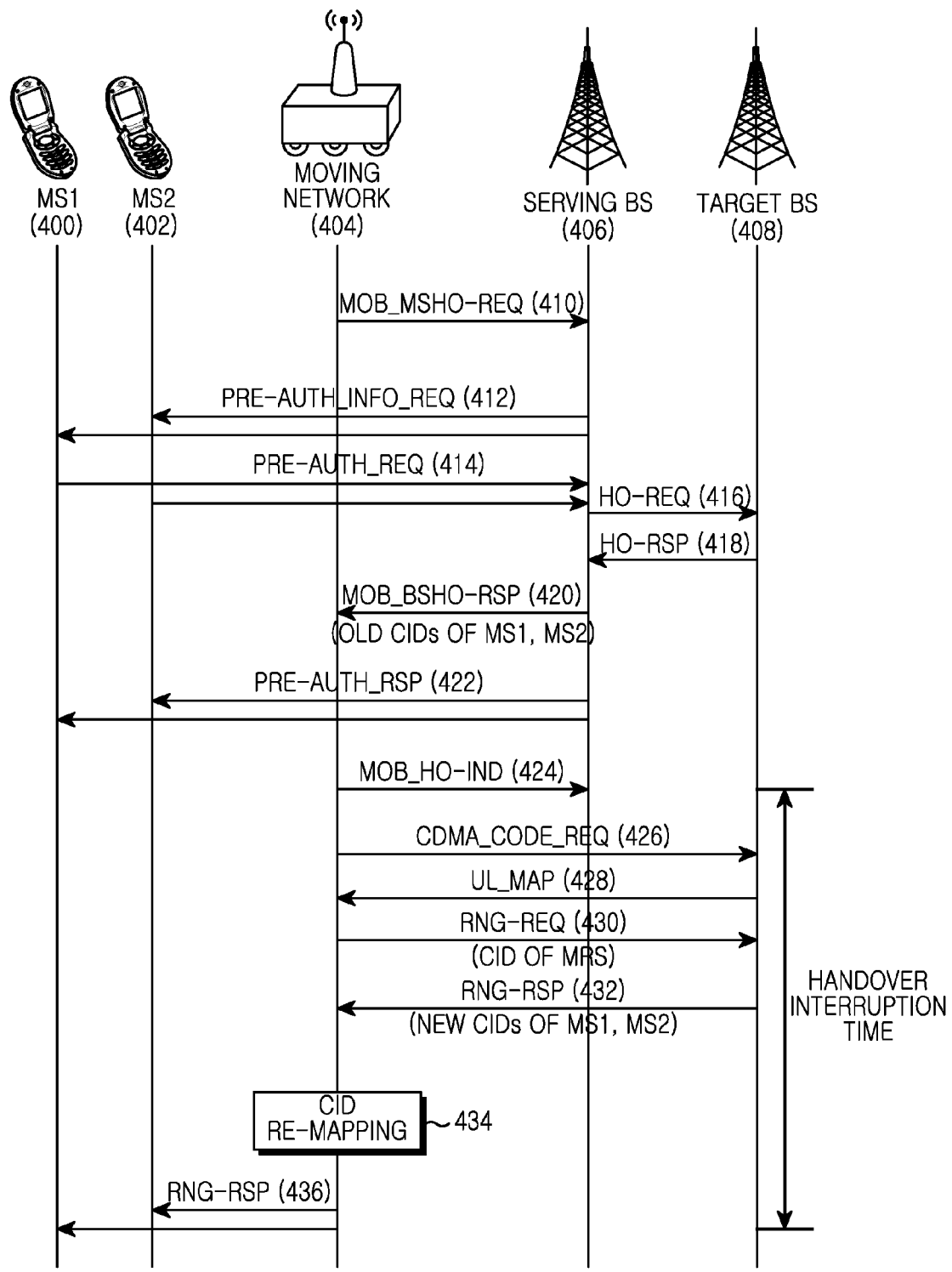
FIG. 4 illustrates signal flows of the mobile relay station for performing handover in place of dependent terminals in the broadband wireless communication system according to an exemplary embodiment of the present invention.

FIG. 4 illustrates the handover procedure of the mobile relay station in place of the dependent mobile stations in the broadband wireless communication system according to an exemplary embodiment of the present invention.

Referring to FIG. 4, first, upon determining that the handover is necessary, an MRS 404 transmits a handover request (MOB_MSHO-REQ) message to a serving BS 406 in step 410. In so doing, the handover request (MOB_MSHO-REQ) message is constituted as shown in Table 1 according to the present invention.

Table 1 shows the construction of the handover request (MOB_MSHO-REQ) message transmitted by the MRS to the serving BS according to the present invention.

TABLE 1

| Syntax | Size | Notes |
|---|---|---|
| Terminal capability | 8 bits | Bitmap indicating presence of metric in message<br>Bit #0: MS<br>Bit #1: MRS<br>Bit #2: Moving network support<br>Bits #3-7: Reserved; shall be set to zero |
| If (Terminal capability[Bit 2] == 1<br>{ | | |
| RSID | 48 bits | |
| N_MS in MN_Index | 8 bits | |
| For (j=0; j<N_MS in MN_Index; j++) { | | |
| MSID<br>} | | |

In Table 1, the "Terminal capability" indicates whether a node transmitting the message serves as the MS or the MRS, or supports a moving network. Herein, the MRS 404 sets a first bit (Bit #1) and a second bit (Bit #2) of the "Terminal capability" to 1. Also, the "RSID" indicates an identifier of the MRS 404, the "N MS in MN Index" indicates the number of MSs 400 and 402 communicating with the serving BS 406 through relay links of the MRS 404, and the "MSID" indicates an identifier of the MSs 400 and 402.

That is, as shown in Table 1, the MRS 404 transmits the handover request (MOB_MSHO-REQ) message including its identifier RSID and the number and the identifiers MSID of the MSs 400 and 402 belonging to the moving network provided by the MRS 404, to the serving BS 406.

Next, the serving BS 406 checks the value of "Terminal capability" of the handover request (MOB_MSHO-REQ) message received from the MRS 404. When the first bit (Bit #1) and the second bit (Bit #2) are set to 1, the serving BS 406 identifies the MRS 404 supporting the moving network and confirms the identifiers MSID of the MSs 400 and 402 belonging to the MRS 404 in the handover request (MOB_M-SHO-REQ) message. Next, the serving BS 406 transmits an authentication information request (Pre-Auth_INFO_REQ) message to the MSs 400 and 402 having the confirmed identifiers MSID in step 412. Herein, the serving BS 406 can request the authentication related information by adding an authorization information request subheader to a packet transmitted to the MSs 400 and 402. In so doing, the authentication information request (Pre-Auth_INFO_REQ) message is encrypted and transmitted at the serving BS 406, and the MRS 404 merely forwards the authentication information request (Pre-Auth_INFO_REQ) message to each MS. Herein, the message requesting the authentication related information is constructed as shown in Table 2.

Table 2 shows the construction of the message for the serving BS to request the authentication related information to the MSs belonging to the MRS according to the present invention.

TABLE 2

Authorization Information Request

| Syntax | Size | Notes |
| --- | --- | --- |
| Authentication Information Request subheader( ){ | | |
| Reason Code | 8 bits | This field indicates the reason to transmit this message<br>Bit 0: Key update<br>Bit 1: Group handover<br>Bit 2: Certificate update<br>Bit 3: Security algorithm update<br>Bits #4-7: Reserved; shall be set to zero |
| PKM Identifier | 8 bits | Using present PKM Identifier |
| } | | |

In Table 2, the "Reason Code" indicates a purpose to transmit the authentication information request message, and the "PKM Identifier" indicates a private key management ID used between the serving BS and the MS. Herein, the BS 406 indicates group handover by setting a first bit (Bit #1) of the "Reason Code" to 1.

The MSs 400 and 402 receiving the authentication information request (Pre-Auth_INFO_REQ) message check the transmission purpose of the message and generate necessary information according to the transmission purpose. Herein, when the transmission purpose of the message is the group handover, the MSs 400 and 402 transmit an authentication request (Pre-AUTH_REQ) message including their authentication information in step 414. In so doing, the authentication request message uses an existing authorization request message provided, and encrypted and transmitted with a security key used by the serving BS and the MSs.

Next, the serving BS 406 transmits a handover request (HO-REQ) message for requesting the handover of the MRS 404 to the target BS 408 via the backhaul in step 416. In so doing, the serving BS 406 piggybacks and transmits the authentication request (Pre-AUTH_REQ) message received from the MSs 400 and 402 on the handover request (HOP-REQ). Herein, the handover request (HO-REQ) message includes the identifier MSID, an estimated time to HandOver (HO), a required BandWidth (BW), and Quality of Service (QoS) information of the MSs belonging to the MRS 404, and additionally includes the identifier RSID, an estimated time to HO, a required BW, and QoS information of the MRS 404.

The target BS 408 receiving the handover request (HO-REQ) message determines whether the authentication information of the MSs 400 and 402 covered by the MRS 404 are updated by checking the authentication request (Pre-AUTH_REQ) message contained in the handover request (HO-REQ) message. When determining the authentication information update of the MSs 400 and 402, the target BS 408 generates an authentication response (Pre-AUTH_RSP) message to transmit to each MS, records whether the handover of the MRS 404 is approved by generating a handover response (HO-RSP) message, and then transmits the handover response (HO-RSP) message to the serving BS 406 over the backhaul by piggybacking the authentication response (Pre-AUTH_RSP) message to transmit to each MS on the handover response (HO-RSP) message in step 418. At this time, the authentication response (Pre-AUTH_RSP) message uses the existing authorization reply message.

Next, the serving BS 406 determines a target BS, transmits a handover response (MOB_BSHO-RSP) message including the information of the target BS 408 to the MRS 404 in step 420, and concurrently transmits the authentication response (Pre-AUTH_RSP) message received from the target BS 408 to the MSs 400 and 402 in step 422. Herein, the serving BS 406 transmits the handover response (MOB_BSHO-RSP) message by including a connection ID (CID) for the MSs 400 and 402 to the handover response (MOB_BSHO-RSP) message.

Herein, the MSs 400 and 402 generate and update the security key to be used in the target BS using the authentication information contained in the received authentication response (Pre-AUTH_RSP) message.

The MRS 404 receiving the handover response (MOB_BSHO-RSP) message disconnects from the serving BS 406 by transmitting a handover indication (MOB_HO-IND) message to the serving BS 406 within a resource retain time in step 424.

Upon disconnecting from the serving BS 406, the MRS 404 performs downlink synchronization with the target BS by receiving FCH and DL MAP over a Radio Frequency (RF) channel of the target BS 408, and transmits a CDMA_code_REQ message including CDMA_Ranging_code to the target BS 408 to reconnect with the target BS 408 in step 426. Next, the target BS 408 transmits uplink resource allocation information (UL-MAP) for transmitting the ranging request message, to the MRS 404 in step 428.

Next, the MRS 404 performs uplink synchronization and updates a physical layer parameter by transmitting a ranging request (RNG-REQ) message to the target BS 408 in step 430, and the target BS 408 updates the CID of all the MSs 400 and 402 belonging to the MRS and transmits a ranging response (RNG-RSP) message including the updated CID information to the MRS 404.

The MRS 404 receiving the ranging response (RNG-RSP) message maps information of the updated CID contained in the ranging response (RNG-RSP) message and the existing CID in step 434, and transmits the ranging response (RNG-RSP) message to the MSs 400 and 402 in step 436. In so doing, by mapping the updated CID and the existing CID, the MRS 404 transmits to the target BS 408 a packet received from the MSs 400 and 402 with the existing CID by changing with the updated CID through a CID mapper, and transmits to the corresponding MS a packet received from the target BS 408 with the updated CID by changing with the existing CID through the CID mapper. Herein, the CID update can take place aperiodically.

Figure 5:
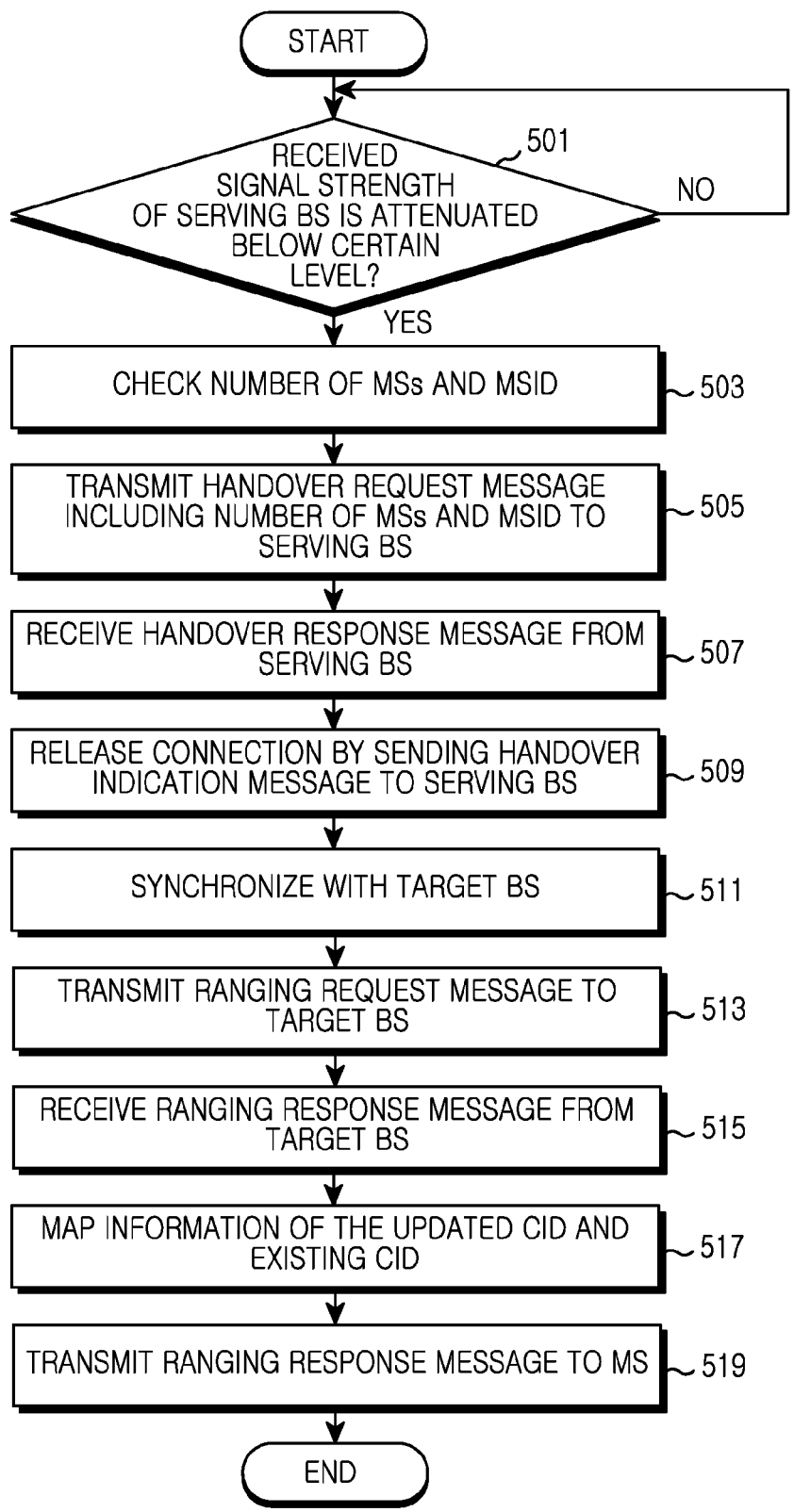
FIG. 5 illustrates operations of the mobile relay station for performing the handover in place of the dependent terminals in the broadband wireless communication system according to an exemplary embodiment of the present invention.

FIG. 5 illustrates operations of the MRS for performing the handover in place of the dependent MSs in the broadband wireless communication system according to an exemplary embodiment of the present invention.

Referring to FIG. 5, the MRS determines whether the handover is required by checking whether a received signal strength of the serving BS is attenuated below a certain level. When the received signal strength of the serving BS is attenuated below the certain level, the MRS determines that the handover is required, checks the number of MSs in its area and the MSID in step 503, and transmits the handover request (MOB_MSHO-REQ) message including the number of the MSs and the MSID to the serving BS in step 505. In so doing, the handover request (MOB_MSHO-REQ) message is constructed as shown in Table. 1 according to the present invention.

Next, the MRS receive the handover response (MOB_BSHO-RSP) message from the serving BS in step 507, and disconnects from the serving BS by transmitting the handover indication (MOB_HO-IND) message to the serving BS within the resource retain time in step 509.

Upon disconnecting from the serving BS, the MRS performs the downlink synchronization with the target BS by receiving the FCH and the DL MAP over the RF channel of the target BS in step 511. In so doing, the MRS transmits the CDMA_code_REQ message including the CDMA_Ranging_code to the target BS and receives the uplink resource allocation information (UL-MAP) for transmitting the ranging request message.

Next, the MRS transmits the ranging request (RNG-REQ) message to the target BS in step 513, and receives the ranging response (RNG-RSP) message including the updated CID information of all of the MSs belonging to the MRS, from the target BS in step 515. Next, the MRS maps the information of the updated CID contained in the ranging response (RNG-RSP) message and the existing CID in step 517, and transmits the ranging response (RNG-RSP) message to the MSs in step 519. In so doing, by mapping the updated CID and the existing CID, the MRS transmits to the target BS the packet received from the MSs with the existing CID by changing with the updated CID through the CID mapper, and transmits to the corresponding MS the packet received from the target BS with the updated CID by changing with the existing CID through the CID mapper.

Next, the MRS finishes this algorithm.

Figure 6:
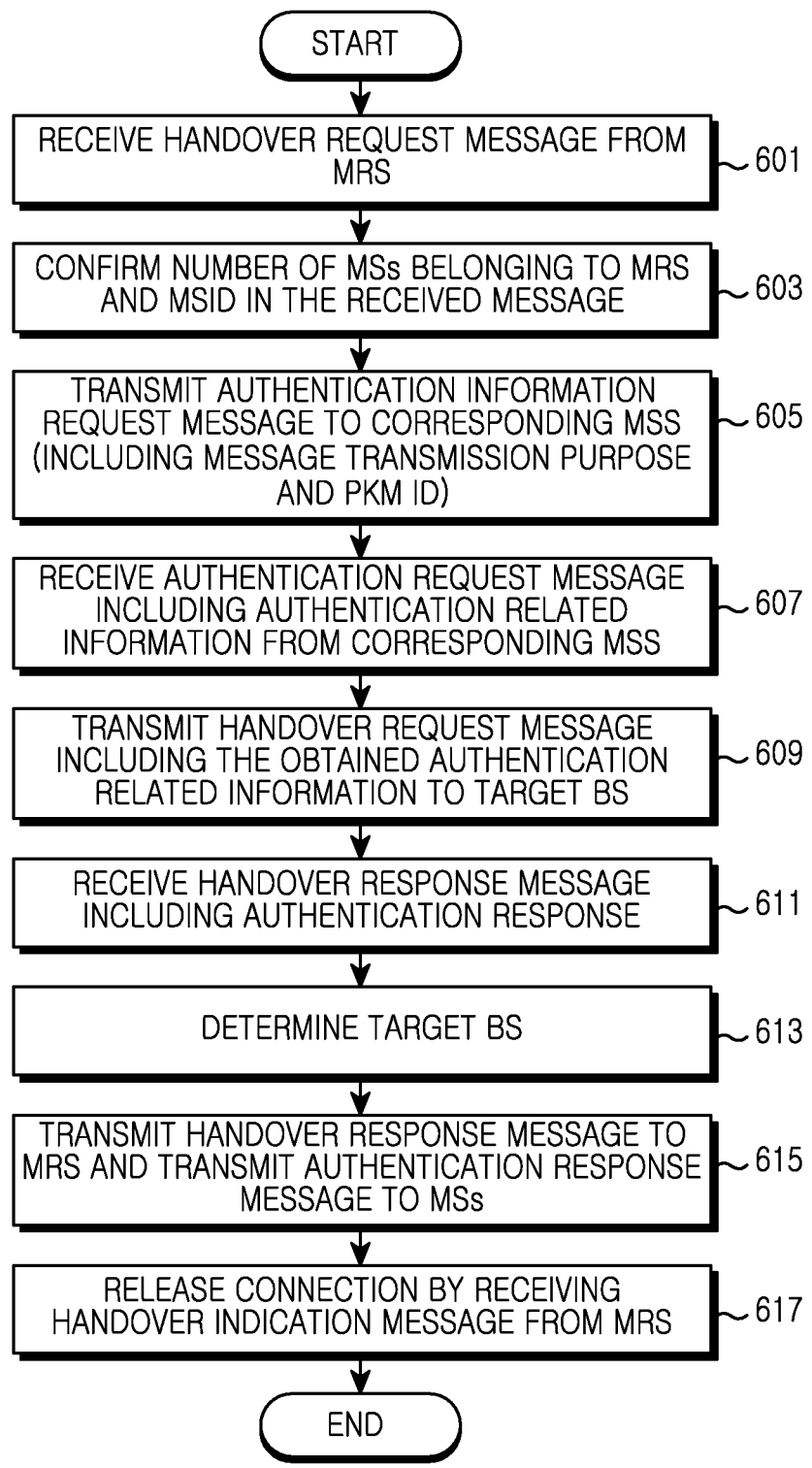
FIG. 6 illustrates operations of a serving base station when the mobile relay station performs the handover in place of the dependent terminals in the broadband wireless communication system according to an exemplary embodiment of the present invention.

FIG. 6 illustrates operations of the serving BS when the MRS performs the handover in place of the dependent MSs in the broadband wireless communication system according to an exemplary embodiment of the present invention.

Referring to FIG. 6, the serving BS receives the handover request (MOB_MSHO-REQ) message constructed as shown in Table 1 from the MRS in step 601, confirms based on "Terminal capability" in the handover request (MOB_MSHO-REQ) message that the node transmitting the handover request message is the MRS supporting the moving network, and confirms the number of the MSs covered by the MRS and the MSID in the handover request (MOB_MSHO-REQ) message in step 603.

Next, the serving BS generates and transmits the authentication information request (Pre-Auth_INFO_REQ) message of Table 2 to the MSs of the confirmed MSID in step 605. Herein, the serving BS can request the authentication related information by adding the authorization information request subheader to the packet transmitted to the MSs. At this time, the authentication information request (Pre-Auth_INFO_REQ) message is encrypted and transmitted at the serving BS, and the MRS merely forwards the authentication information request (Pre-Auth_INFO_REQ) message to each MS. Herein, the serving BS indicates that the transmission purpose of the message is the group handover by setting 1 (bit #1) of "Reason Code" to 1 in the message for requesting the authentication related information, and adds a Privacy and Key Management IDentifier (PKM ID) used between the serving BS and the MS.

Next, the serving BS receives the authentication request (Pre-AUTH_REQ) message including the authentication related information from the MSs in step 607, and transmits the handover request (HO-REQ) message for requesting the handover of the MRS to the target BS over the backhaul in step 609. In so doing, the serving BS piggybacks the authentication request (Pre-AUTH_REQ) message received from the MSs on the handover request (HOP-REQ) message and thus transmits. Herein, the handover request (HO-REQ) message includes the MSID, the estimated time to HO, the required BW, and the QoS information of the MSs belonging to the MRS, and additionally includes the RSID, the estimated time to HO, the required BW, and the QoS information of the MRS.

Next, the serving BS receives the handover response (HO-RSP) message including the authentication response (Pre-AUTH_RSP) message from the target BS in step 611, and determines a handover target BS of the MRS in step 613. Next, the serving BS transmits the handover response (MOB_HO-RSP) message to the MRS and transmits the authentication response (Pre-AUTH_RSP) message received from the target BS to the MSs in step 615.

Next, the serving BS disconnects from the MRS by receiving the handover indication (MOB_HO-IND) message from the MRS in step 617, and finishes this algorithm.

Figure 7:
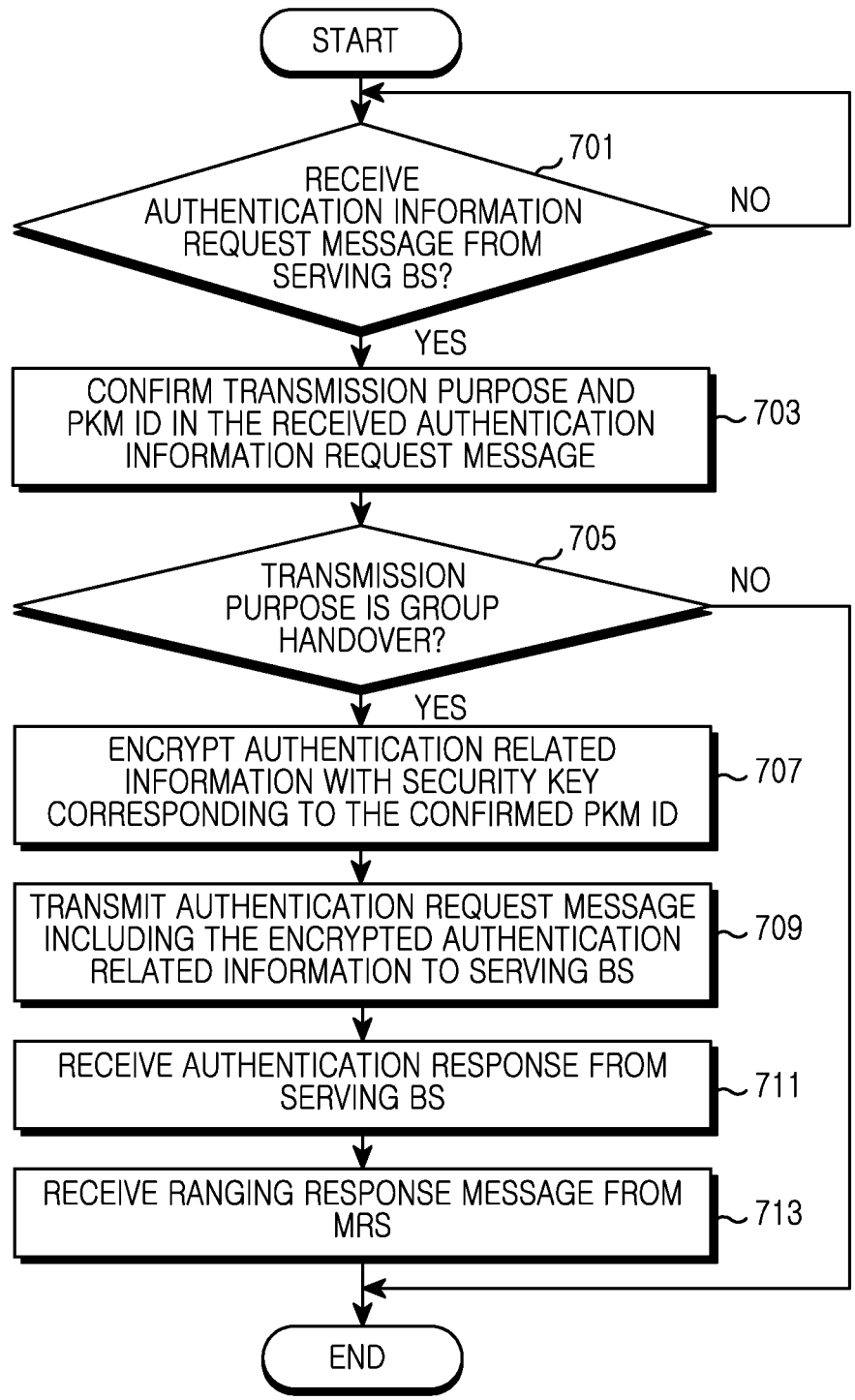
FIG. 7 illustrates operations of the terminals when the mobile relay station performs the handover in place of the dependent terminals in the broadband wireless communication system according to an exemplary embodiment of the present invention.

FIG. 7 illustrates operations of the MSs when the MRS performs the handover in place of the dependent MSs in the broadband wireless communication system according to an exemplary embodiment of the present invention.

Referring to FIG. 7, when receiving the authentication information request (Pre-Auth_INFO_REQ) message of Table 2 from the serving BS in step 701, the MS confirms the transmission purpose of the message and the PKM ID by analyzing the received authentication information request (Pre-Auth_INFO_REQ) message in step 703.

The MS examines whether the purpose of the message is the group handover in step 705. When the purpose of the message is not the group handover, the MS finishes this algorithm and performs the corresponding operation. When the purpose of the message is the group handover, the MS encrypts the authentication related information with the security key corresponding to the PKM ID in step 707 and transmits the authentication request (Pre-AUTH_REQ) message including the encrypted authentication related information to the serving BS in step 709.

Next, the MS receives the authentication response (Pre-AUTH_RSP) message from the serving BS in step 711, and receives the ranging response message from the MRS in step 713. Herein, the MS can generate and update the security key to be used in the target BS using the authentication information contained in the authentication response (Pre-AUTH_RSP) message.

Next, the MS finishes this algorithm.

Figure 8:
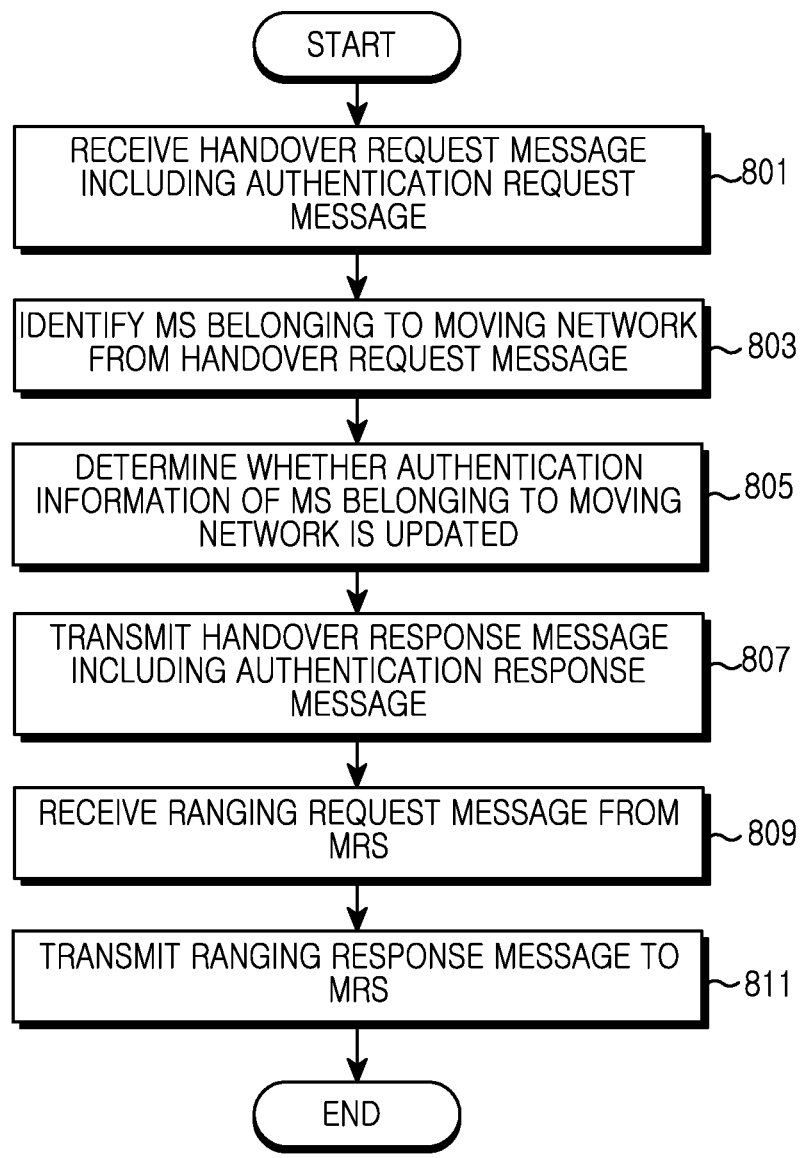
FIG. 8 illustrates operations of a target base station when the mobile relay station performs the handover in place of the dependent terminals in the broadband wireless communication system according to an exemplary embodiment of the present invention.

FIG. 8 illustrates operations of the target BS when the MRS performs the handover in place of the dependent MSs in the broadband wireless communication system according to an exemplary embodiment of the present invention.

Referring to FIG. 8, the target BS receives the handover request message including the authentication request message from the serving BS over the backhaul in step 801, and identifies the MS belonging to the moving network from the authentication request message contained in the handover request message in step 803. That is, the target BS identifies the MSs covered by the MRS for which the serving BS requests the handover.

Next, the target BS determines whether the authentication information of the MS belonging to the moving network is updated in step 805. When determining the authentication information update, the target BS generates the authentication response (Pre-AUTH_RSP) message to transmit to each MS, generates the handover response (HO-RSP) message, records whether the handover of the MRS is approved, in the generated handover response (HO-RSP) message, and then transmits the handover response (HO-RSP) message to the serving BS over the backhaul by piggybacking the authentication response (Pre-AUTH_RSP) message to transmit to each MS on the handover response (HO-RSP) message in step 807.

Next, the target BS receives the ranging request (RNG-REQ) message in step 809, updates the CID of all the MSs covered by the MRS, and transmits the ranging response (RNG-RSP) message including the updated CID information to the MRS in step 811.

Next, the target finishes this algorithm.

Now, the handover of the mobile relay station in place of the dependent terminals in the 3GPP LTE system is explained by referring to FIGS. 9 through 13.

Figure 9:
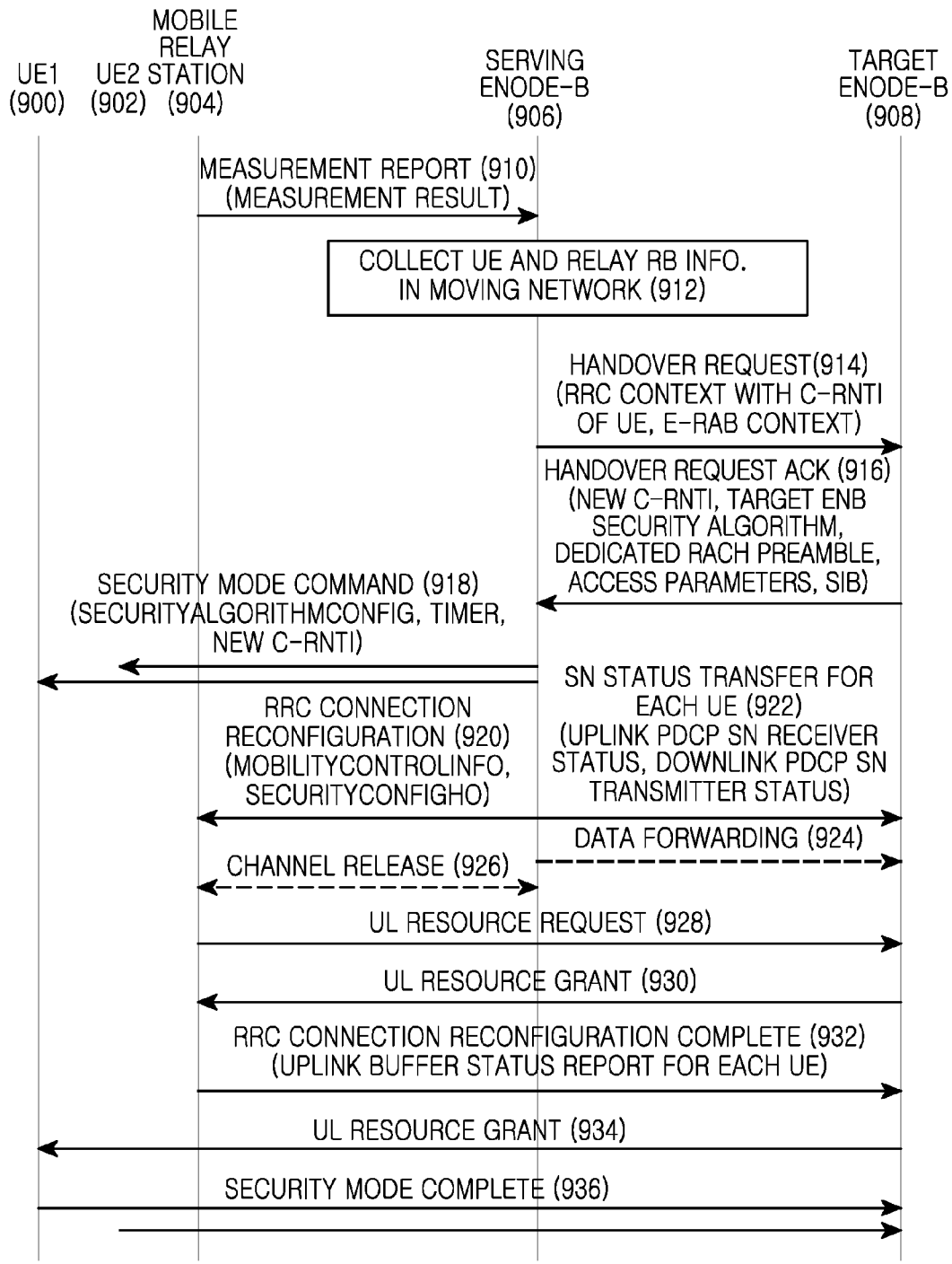
FIG. 9 illustrates signal flows of the mobile relay station for performing the handover in place of the dependent terminals in the broadband wireless communication system according to another exemplary embodiment of the present invention.

FIG. 9 illustrates signal flows of the mobile relay station for performing the handover in place of the dependent terminals in the broadband wireless communication system according to another exemplary embodiment of the present invention.

Referring to FIG. 9, when determining that the handover is necessary, a mobile relay station 904 transmits a measurement report message including information of neighboring eNode Bs to a serving eNode B 906 in step 910. In so doing, the measurement report message is constituted as shown in Table 3 according to the present invention.

Table 3 shows the construction of the measurement report message transmitted from the mobile relay station to the serving eNode B according to the present invention.

TABLE 3

| parameter | Notes |
| --- | --- |
| meas ID | Measurement Trigger node ID |
| measResultServCell | Measurement result of serving eNode B |
| measResultNeighCells | Measurement information of neighboring eNode B |
| | trigger Type: type of measurement trigger |
| | physCellID: Cell ID of measurement eNode B |
| | measResult: measurement information |
| relayCellID | Cell ID of mobile relay station |
| Relay Type | Type of mobile relay station |

As shown in Table 3, the mobile relay station transmits the measurement report message by additionally adding 'relayCellID' and 'relayType' to an existing measurement report message according to the present invention. Herein, 'relayCellID' indicates a cell identifier of the relay station, and 'relayType' denotes a type of the relay station. Herein, the 'relayType' can indicate whether the corresponding relay station is a fixed relay station or a mobile relay station and whether the corresponding relay station serves as the eNode B or the relay station for merely forwarding the signal.

The serving eNode B 906 receiving the measurement report message examines whether the measurement report message is received from the mobile relay station of a simple type, based on 'relayCellID' and 'relayType' contained in the measurement report message. Herein, the mobile relay station of the simple type indicates the relay station which merely forwards the signal without serving as the eNode B.

When the measurement report message is received from the mobile relay station of the simple type, the serving eNode B 906 collects information relating to the mobile relay station and information relating to UEs 900 and 902 subordinate to the mobile relay station in step 912, and then generates based on the collected information and transmits a handover request message to the target eNode B 908 in step 914. That is, the serving eNode B 906 collects radio resource information of the mobile relay station, additionally collects the number of UEs subordinate to the mobile relay station, security key information, and radio resource information as shown in Table 4, and then adds the collected information to the handover request message.

Table 4 shows the information added to the handover request message transmitted from the serving eNode B to the target eNode B according to the present invention.

TABLE 4

| parameter | Notes |
| --- | --- |
| relayCellID | Cell ID of mobile relay station |
| numberofUE | Number of UEs belonging to the mobile relay station |
| contextUE | Required context information for handover of UE belonging to the mobile relay station |
| | UE X2 signaling context reference at source eNB |
| | UE S1 EPC signaling context reference |
| | Target cell ID |
| | Key information for UE used in serving eNB |
| | RRC context (C-RNTI) |
| | E-RAB context |

Herein, the 'context UE' indicates information of each UE, and includes signaling information (UE X2 signaling context reference at source eNB, UE S1 EPC signaling context reference) of each UE, target eNode B ID (Target cell ID), security key information used at the serving eNode B (Key information for UE used in serving eNB), RRC context, and radio access bearer (E-RAB) information as shown in Table 4. Herein, the RCC context information includes Cell Radio Network Temporary (C-RNTI) of the corresponding UE.

Next, the target eNode B 908 determines whether to approve the handover for part or all of the mobile relay station and the UEs, using the information of the mobile relay station and the UEs recorded in the handover request message. When determining to approve the handover, the target eNode B transmit a handover request ACK message indicating the handover approval to the serving eNode B 906 in step 916. Herein, the target eNode B adds information of Table 5 to the handover request ACK message according to the present invention.

TABLE 5

| parameter | notes |
| --- | --- |
| relayCellID | Cell ID of mobile relay station |
| numberofUE | Number of UEs belonging to the mobile relay station |
| contextUE | Changing request information for UE belonging to the mobile relay station |
| | old C-RNTI |
| | new C-RNTI |
| | target eNB security algorithm identifier |
| | dedicated RACH preamble |
| | access parameters |

Herein, the 'context UE' indicates information of each UE, and includes old C-RNTI and new C-RNTI for each UE, security algorithm ID of the target eNode B (target eNB security algorithm identifier), dedicated Random Access CHannel (RACH) preamble, and access parameters information as shown in Table 5. Herein, the 'old C-RNTI' indicates the ID used by each UE at the serving eNode B, and 'new C-RNTI' indicates the ID to be used by each UE at the target eNode B after the handover.

The serving eNode B 906 receiving the handover request ACK message checks the security algorithm ID of the target eNode B contained in the handover request ACK message and compares with the security algorithm ID of the serving eNode B 906. Herein, when the security algorithm ID of the serving eNode B 906 and the target eNode B 908 is not the same or when the two security algorithm IDs are the same but a security key update time is expected to expire in the serving eNode B 906 before the handover for the mobile relay station and the UEs is completed, the serving eNode B 906 transmits a security mode command message to the UEs 900 and 902 in step 918. Herein, the security mode command message is constituted as shown in Table 6.

Table 6 shows the construction of the security mode command message transmitted from the serving eNode B to the UEs according to the present invention.

TABLE 6

| parameter | notes |
|---|---|
| C-RNTI | C-RNTI used by mobile terminal in the serving eNode B |
| securityAlgorithmConfig | security algorithm information of the target eNode B |
| new C-RNTI | C-RNTI to be used in target eNode B |
| Timer | Activated time of securityAlgorithmConfig and new C-RNTI (i.e., T304) |

Herein, the 'Timer' indicates the time for the UE to use a new security key and a new C-RNTI according to the security algorithm information of the target eNode B, which is after the handover.

Next, the serving eNode B 906 generates an RRC connection reconfiguration message including the handover related information contained in the handover request ACK message and transmits the message to the UE 904 in step 920, and transmits to the target eNode B 908 a Sequence Number (SN) status transfer message indicating data transmission status for each UE in step 922. That is, the RRC connection reconfiguration message can include the security algorithm ID of the target eNode B, a dedicated RACH preamble, access parameters, and a System Information Block (SIB). The SN status transfer message includes information indicating data transmitted by the serving eNode B 906 and data to transmit by the target eNode B 908 among data relating to each UE existing in a serving gateway. Next, the serving eNode B 906 can forward data not transmitted to the UEs 900 and 908 due to the handover procedure, to the target eNode B 908 in step 924.

Next, when the channel to the serving eNode B 906 is released in step 926, the mobile relay station 904 transmits an UpLink (UL) resource request message to the target eNode B 908 in step 928 and receives a UL resource grant message from the target eNode B 908 in step 930. That is, when the connection to the serving eNode B 906 is terminated, the mobile relay station 904 synchronizes with the target eNode B 908 and obtains the uplink radio resource. In so doing, the mobile relay station can perform contention-free random access using the dedicated RACH preamble contained in the RRC connection reconfiguration message received from the serving eNode B 906.

The mobile relay station 904 allocated the UL resource transmits an RRC connection reconfiguration complete message to the target eNode B 908 in step 932. The RRC connection reconfiguration complete message includes a UL buffer status report message for the UEs 900 and 902. Herein, the UL buffer status report message includes resource information required for each UE to transmit a security mode complete message and resource information required to transmit the stored UL data during the handover procedure.

Next, the target eNode B 908 confirms the UL resource required by the UEs 900 and 902 from the RRC connection reconfiguration complete message and transmits a message allocating the UL resource to the UEs 900 and 902 in step 934.

The UEs 900 and 902 transmit to the target eNode B 908 a security mode complete message which is a response message for the security mode command received from the serving eNode B 906 in step 936. Next, the UEs 900 and 902 receive the service from the target eNode B 908 via the mobile relay station 904.

Figure 10:
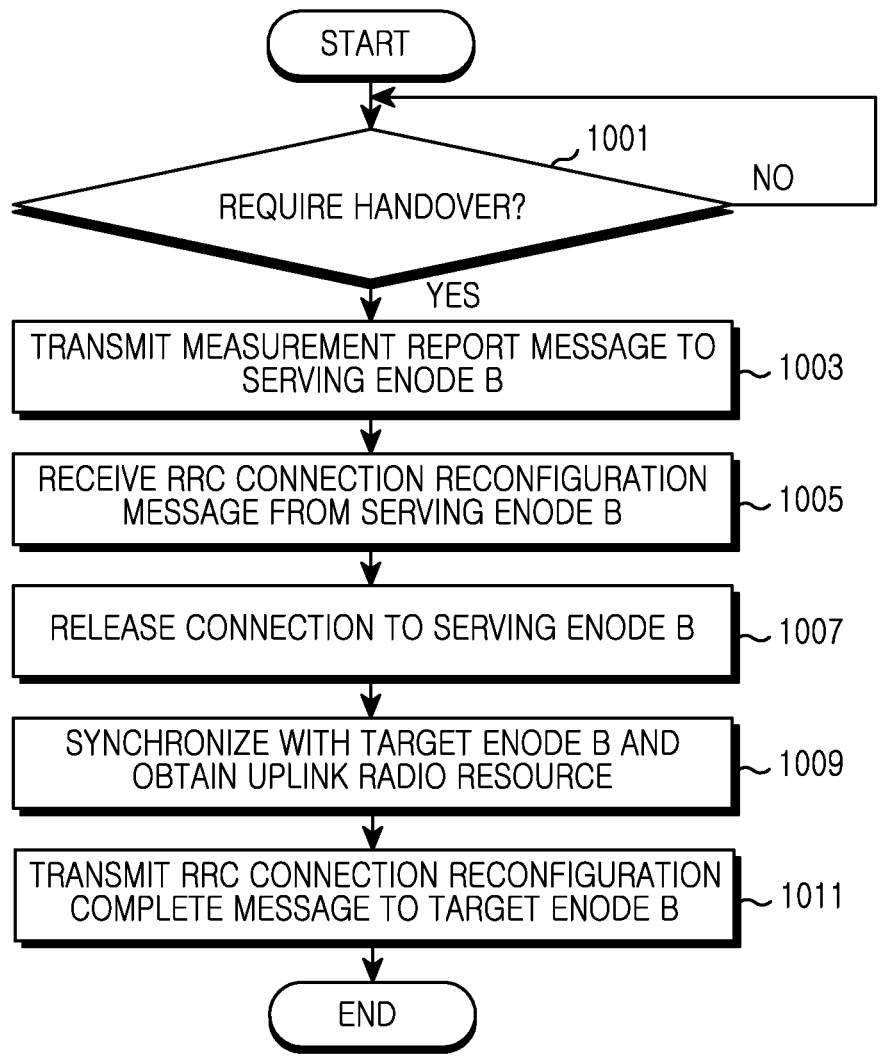
FIG. 10 illustrates operations of the mobile relay station for performing the handover in place of the dependent terminals in the broadband wireless communication system according to another exemplary embodiment of the present invention.

FIG. 10 illustrates operations of the mobile relay station for performing the handover in place of the dependent UEs in the broadband wireless communication system according to another exemplary embodiment of the present invention.

Referring to FIG. 10, the mobile relay station checks whether the handover is required in step 1001. In so doing, when a measurement trigger condition received from the serving eNode B is satisfied, the mobile relay station can determine that the handover is necessary.

Next, the mobile relay station generates and transmits the measurement report message to the serving eNode B in step 1003. In so doing, the measurement report message is constituted as shown in Table 3.

Next, the mobile relay station receives the RRC connection reconfiguration message from the serving eNode B and releases the connection to the serving eNode B in step 1005. Herein, the RRC connection reconfiguration message is the message instructing the handover to the target eNode B, and can include the necessary information for the handover to the target eNode B; that is, the security algorithm ID of the target eNode B, the dedicated RACH preamble, the access parameters, and the SIB.

Next, the mobile relay station synchronizes with the target eNode B and obtains the UL radio resource in step 1009. At this time, the mobile relay station can perform the contention-free random access using the dedicated RACH preamble contained in the RRC connection reconfiguration message received from the serving eNode B.

Next, the mobile relay station generates and transmits the RRC connection reconfiguration complete message to the target eNode B in step 1011. Herein, the mobile relay station includes the message reporting of the UL buffer status of its dependent UEs, to the RRC connection reconfiguration complete message. That is, the mobile relay station calculates the resource information required for its dependent UE to transmit the security mode complete message and to transmit the stored UL data during the handover procedure, and transmits to the target eNode B using the RRC connection reconfiguration complete message.

Next, the mobile relay station finishes this algorithm.

Figure 11:
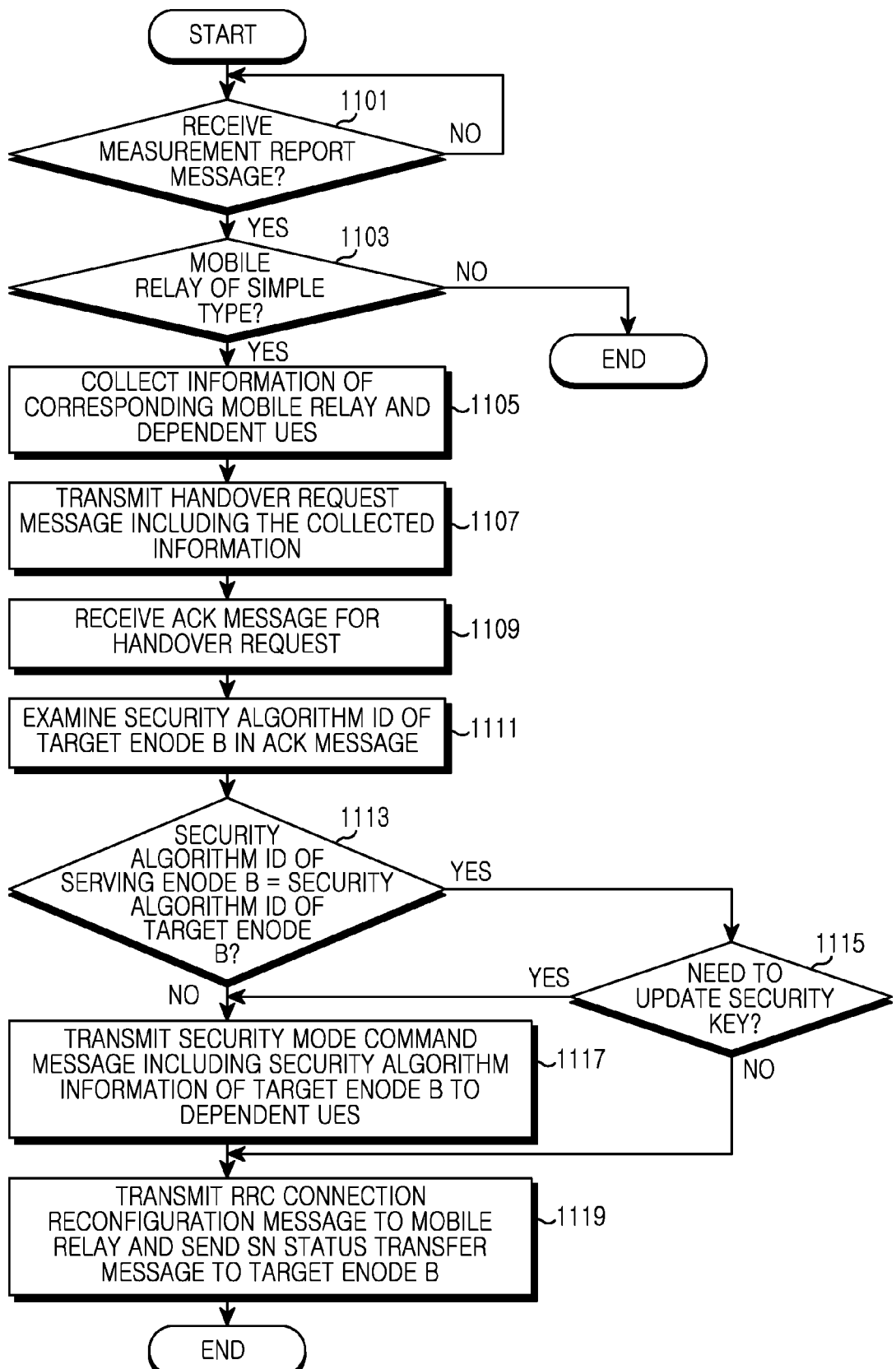
FIG. 11 illustrates operations of the serving base station when the mobile relay station performs the handover in place of the dependent terminals in the broadband wireless communication system according to another exemplary embodiment of the present invention.

FIG. 11 illustrates operations of the serving eNode B when the mobile relay station performs the handover in place of the dependent UEs in the broadband wireless communication system according to another exemplary embodiment of the present invention.

Referring to FIG. 11, the serving eNode B checks whether the measurement report message is received from the relay station in step 1101.

Upon receiving the measurement report message, the serving eNode B examines whether the relay station transmitting the measurement report message is the mobile relay station of the simple type, using the cell identifier (relayCellID) and the relay station type (relayType) information of the relay station contained in the measurement report message. Herein, the mobile relay station of the simple type indicates the relay station which merely forwards the signal without serving as the eNode B. When the relay station transmitting the measurement report message is not the mobile relay station of the simple type, the serving eNode B finishes this algorithm and operates according to the conventional method.

By contrast, when the relay station transmitting the measurement report message is the mobile relay station of the simple type, the serving eNode B collects the information of the mobile relay station and the UEs belonging to the mobile relay station in step 1105, and generates and transmits the handover request message including the collected information to the target eNode B in step 1107. That is, the serving eNode B collects the necessary information for the handover of the mobile relay station, additionally collects the number of the UEs belonging to the mobile relay station, the security key information, and the radio resource information of the UEs, and then adds and transmits the information of Table 4 to a conventional handover request message.

Next, the serving eNode B receives the handover request ACK message indicating the handover approval for the mobile relay station and the UEs, from the target eNode B in step 1109. Herein, the handover request ACK message includes the information of Table 5.

Next, the serving eNode B examines the security algorithm ID of the target eNode B in the handover request ACK message in step 1111, and then examines whether the security algorithm ID of the target eNode B is the same as the security algorithm ID of the serving eNode B in step 1113.

When the security algorithm ID of the target eNode B is not the same as the security algorithm ID of the serving eNode B, the serving eNode B determines that the security key update of the UEs is required and proceeds to step 1117. By contrast, when the security algorithm ID of the target eNode B is the same as the security algorithm ID of the serving eNode B, the serving eNode B determines whether the security key update is necessary according to whether its security key update timer expires during the handover of the mobile relay station and the UEs in step 1115. That is, the serving eNode B compares the estimated time of the handover completion with the key update timer. When the key update timer is shorter than the estimated time of the handover completion, the serving eNode B determines that the security key update is needed. Otherwise, the serving eNode B determines that the security key update is not needed.

When the security key update is not necessary, the serving eNode B goes to step 1119. When the security key update is necessary, the serving eNode B transmits the security mode command message including the security algorithm information of the target eNode B to the UEs belonging to the mobile relay station in step 1117. In so doing, the security mode command message includes the information of Table 6.

Next, the serving eNode B generates and transmits the RRC connection reconfiguration message including the handover related information contained in the handover request ACK message, to the mobile relay station, and transmits the SN status transfer message indicating the data transmission status for each UE to the target eNode B in step 1119. That is, the RRC connection reconfiguration message includes the security algorithm ID of the target eNode B, the dedicated RACH preamble, the access parameters, and the SIB, and the SN status transfer message includes the information indicating the data transmitted by the serving eNode B and the data to transmit by the target eNode B among the data relating to each UE existing in the serving gateway. At this time, the serving eNode B can forward data not transmitted to the UEs due to the handover procedure, to the target eNode B.

Next, the serving eNode B finishes this algorithm.

Figure 12:
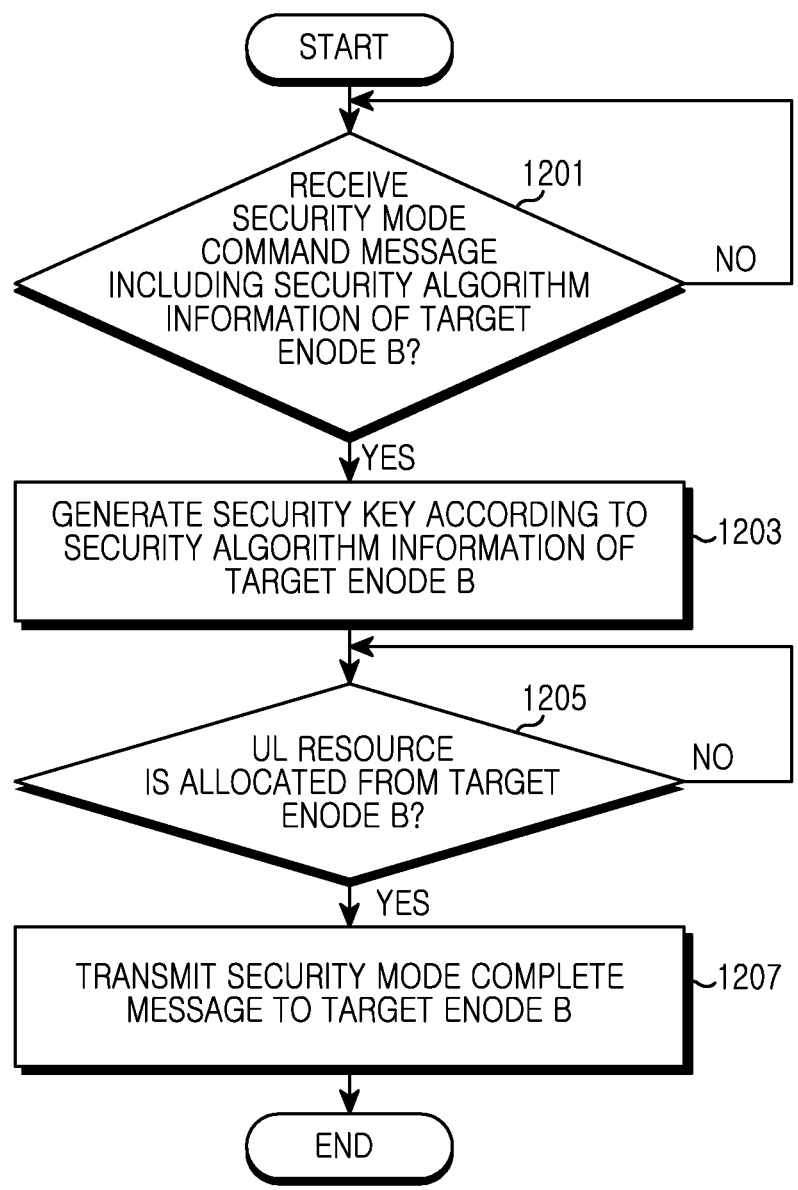
FIG. 12 illustrates operations of the terminals when the mobile relay station performs the handover in place of the dependent terminals in the broadband wireless communication system according to an exemplary embodiment of the present invention.

FIG. 12 illustrates operations of the UEs when the mobile relay station performs the handover in place of the dependent UEs in the broadband wireless communication system according to an exemplary embodiment of the present invention.

Referring to FIG. 12, the UE communicating via the mobile relay station of the simple type checks whether the security mode command message including the security algorithm information of the target eNode B is received from the serving eNode B in step 1201. Herein, the security mode command message contains the information of Table 6.

Upon receiving the security mode command message, the UE generates and updates the security key to be used in the target eNode B according to the security algorithm information of the target eNode B contained in the security mode command message in step 1203.

Next, the UE checks whether the UL resource is allocated from the target eNode B in step 1205. When the UL resource is allocated, the UE transmits the security mode complete message indicating that the security key is generated, to the target eNode B and finishes this algorithm.

Figure 13:
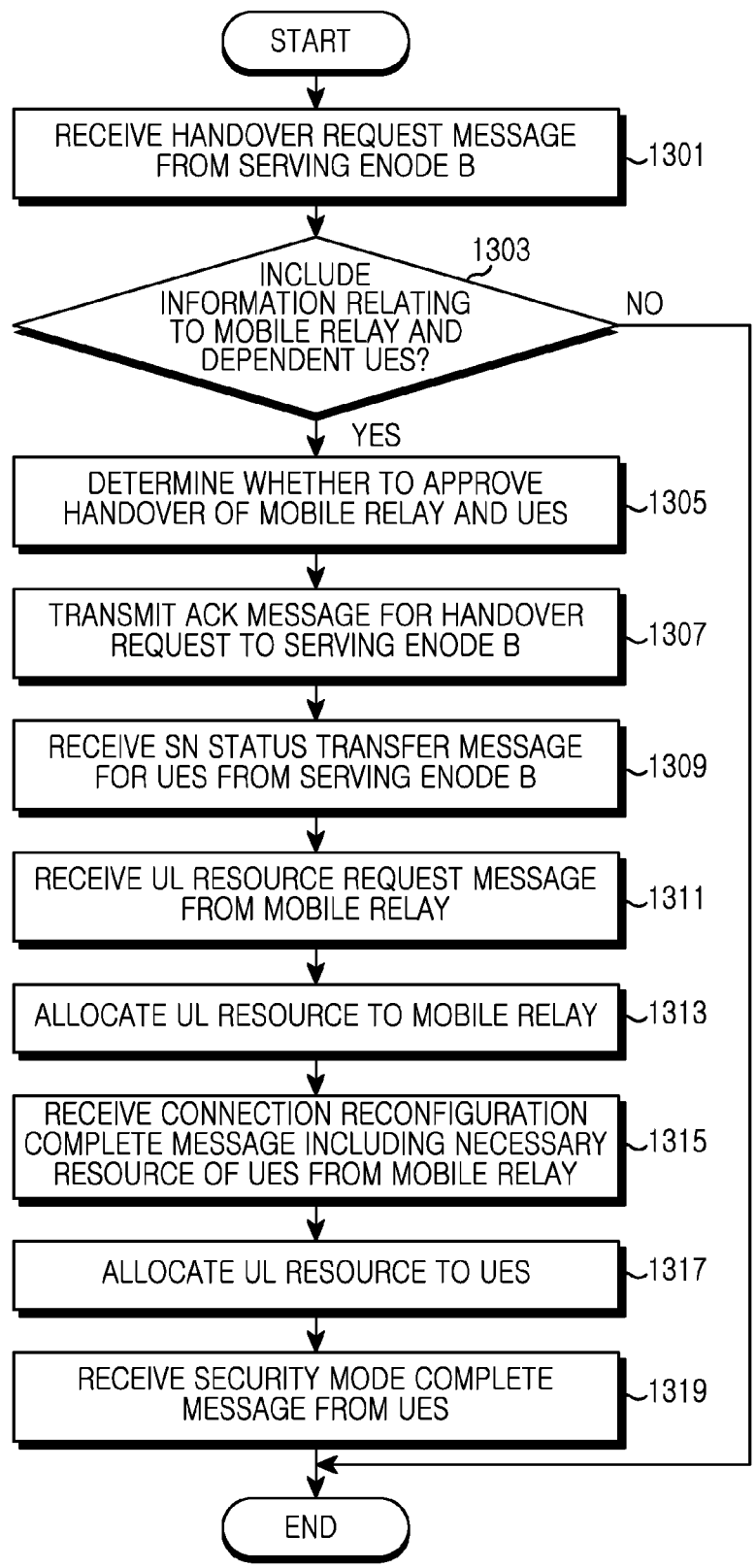
FIG. 13 illustrates operations of the target base station when the mobile relay station performs the handover in place of the dependent terminals in the broadband wireless communication system according to another exemplary embodiment of the present invention.

FIG. 13 illustrates operations of the target eNode B when the mobile relay station performs the handover in place of the dependent UEs in the broadband wireless communication system according to another exemplary embodiment of the present invention.

Referring to FIG. 13, the target eNode B receives the handover request message from the serving eNode B in step 1301, and determines whether the handover request message includes the information relating to the mobile relay station and the UEs in step 1303. When the handover request message does not include the information relating to the mobile relay station and the UEs, the target eNode B finishes this algorithm and operates according to the conventional method.

By contrast, when the handover request message includes the information relating to the mobile relay station and the UEs; that is, includes the information of Table 4, the target eNode B determines whether to approve the handover of the mobile relay station and the UEs in step 1305. Herein, the target eNode B can determine whether to approve the handover, based on the E-RAB information of the mobile relay station and the UEs contained in the handover request message. Herein, it is assumed that the target eNode B approves the handover of the mobile relay station and the UEs.

Next, the target eNode B transmits the handover request ACK message indicating the handover approval for the mobile relay station and the UEs, to the serving eNode B in step 1307. In so doing, the handover request ACK message includes the information of Table 5.

Next, the target eNode B receives the SN status transfer message relating to the UEs, from the serving eNode B in step 1309. Herein, the SN status transfer message includes the information indicating the data transmitted by the serving eNode B and the data to transmit by the target eNode B among the data relating to each UE existing in the serving gateway. At this time, the target eNode B can receive the data not transmitted by the serving eNode B due to the handover procedure.

Next, the target eNode B receives the UL resource request message from the mobile relay station in step 1311, and transmits the message for allocating the UL resource to the mobile relay station in step 1313.

Next, the target eNode B receives the RRC connection reconfiguration complete message indicating the resource required by the UEs, from the mobile relay station over the UL resource allocated to the mobile relay station in step 1315. That is, the RRC connection reconfiguration message includes the UL buffer status report message for each UE.

Next, the target eNode B confirms the UL resource required by the UEs from the RRC connection reconfiguration complete message and transmits the message for allocating the UL resource to the UEs in step 1317, and then receives from the UEs the security mode complete message indicating that the security key in the target eNode B is successfully generated in step 1319.

Next, the target eNode B finishes this algorithm.

In the broadband wireless communication system supporting the mobile relay station, the mobile relay station performs the handover in place of the dependent terminals, and the serving base station obtains the authentication information of the terminals during the handover preparation procedure and performs the authentication for the terminals with the target base station over the backhaul. Therefore, it is possible to overcome the weak points in the security and to prevent the increase of the service interruption time, and even the mobile relay station of the simple type which merely forwards the signal can accomplish the handover in place of the plurality of the dependent terminals.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a serving base station for group handover of a mobile relay station in a broadband wireless communication system, comprising:
   when receiving a measurement report message from a relay station, determining whether the relay station is a mobile relay station of a simple type which forwards a signal;
   collecting, when the relay station is a mobile relay station of a simple type, information needed for handover of the mobile relay station and mobile terminals belonging to the mobile relay station, from pre-stored information;
   requesting handover of the mobile relay station and the mobile terminals by transmitting a handover request including the collected information to a target base station; and
   receiving a message indicating whether the handover of the mobile relay station and the mobile terminals is approved, from the target base station.

2. The method of claim 1, wherein the measurement report message comprises at least one of a cell identifier and a relay station type of the relay station, and
   the relay station type indicates at least one of a fixed relay station, a mobile relay station, a relay station for serving as a base station, and a relay station of a simple type for forwarding a signal.

3. The method of claim 1, wherein the information needed for the handover comprises at least one of a cell identifier of the mobile relay station, the number of mobile terminals belonging to the mobile relay station, signaling information of a mobile terminal, RRC context of a mobile terminal, radio access bearer information of a mobile terminal, a cell radio network identifier of a mobile terminal, a target base station cell identifier of a mobile terminal, and a security key for a serving base station of a mobile terminal.

4. The method of claim 1, further comprising:
   comparing security algorithm information of a target base station contained in the message indicating whether the handover is approved, with security algorithm information of the serving base station;
   when the security algorithm information of the target base station and the serving base station do not match, transmitting the security algorithm information of the target base station to the mobile terminals; and
   when the security algorithm information of the target base station and the serving base station match and a security key update time of the serving base station is shorter than an estimated time for handover completion, transmitting the security algorithm information of the target base station to the mobile terminals.

5. The method of claim 4, wherein, when the security algorithm information of the target base station is transmitted, receiving at the mobile terminals at least one of a cell radio network identifier used by a mobile terminal in the serving base station, an updated cell radio network identifier of a mobile terminal obtained from the target base station, and time information for using the updated cell radio network identifier.

6. A serving base station for group handover of a mobile relay station in a broadband wireless communication system, the serving base station which determines whether the mobile relay station is a mobile relay station of a simple type which forwards a signal when received a measurement report message from a mobile relay station, collects information needed for the handover of the mobile relay station and mobile terminals belonging to the mobile relay station, when the relay station is a mobile relay station of a simple type, from pre-stored information, requests handover of the mobile relay station and the mobile terminals by transmitting a handover request including the collected information to a target base station, and receives a message indicating whether the handover of the mobile relay station and the mobile terminals is approved, from the target base station.

7. The serving base station of claim 6, wherein the measurement report message comprises at least one of a cell identifier and a relay station type of the relay station,
   the relay station type indicates at least one of a fixed relay station, a mobile relay station, a relay station for serving as a base station, and a relay station of a simple type for forwarding a signal,
   the information needed for the handover comprises at least one of a cell identifier of the mobile relay station, the number of mobile terminals belonging to the mobile relay station, signaling information of a mobile terminal, RRC context of a mobile terminal, radio access bearer information of a mobile terminal, a cell radio network identifier of a mobile terminal, a target base station cell identifier of a mobile terminal, and a security key for a serving base station of a mobile terminal.

8. The serving base station of claim 6, wherein the serving base station compares security algorithm information of a target base station contained in the message indicating whether the handover is approved, with security algorithm information of the serving base station, transmits the security algorithm information of the target base station to the mobile terminals when the security algorithm information of the target base station and the serving base station do not match, and transmits the security algorithm information of the target base station to the mobile terminals when the security algorithm information of the target base station and the serving base station match and a security key update time of the serving base station is shorter than an estimated time for handover completion.

* * * * *